July 15, 1941.　　　G. K. McCANN　　　2,249,220

BRAKE

Filed April 20, 1940

INVENTOR.
GEORGE K. McCANN
BY
ATTORNEY.

Patented July 15, 1941

2,249,220

UNITED STATES PATENT OFFICE 2,249,220

BRAKE

George K. McCann, South Bend, Ind., assignor to Bendix Aviation Corporation, South Bend, Ind., a corporation of Delaware Application April 20, 1940, Serial No. 330,645

2 Claims. (Cl. 188—196)

This invention relates to brakes, and is illustrated as embodied in a mechanical operating system connecting the emergency brake lever to the rear brakes of a four-wheel brake system. For service purposes the brakes may be operated by a separate hydraulic or mechanical system.

An object of the invention is to provide means for adjusting the brake-operating connections which will be simple and easily adjusted, and which will take up any slack and at the same time will equalize the pull on the opposite brakes.

The above and other objects, and various structural features of novelty, of the invention will be apparent from the following description of the illustrative embodiment shown in the accompanying drawing, in which.

Figure 1:
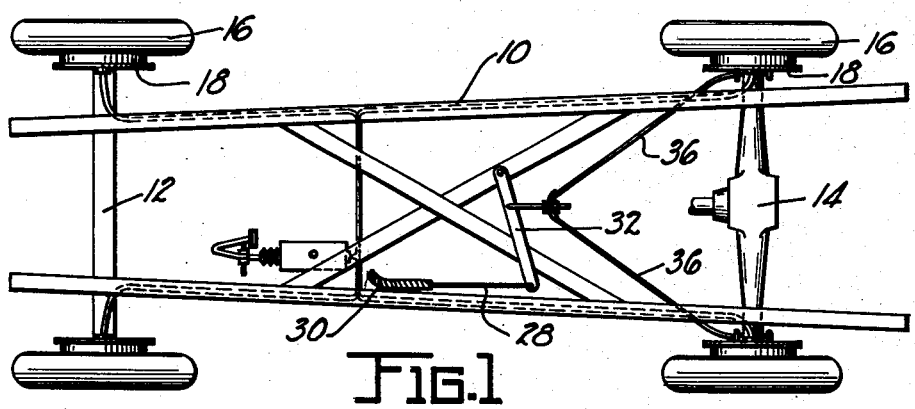
Figure 1 is a diagrammatic plan view of an automobile chassis embodying my invention.
Figure 2:
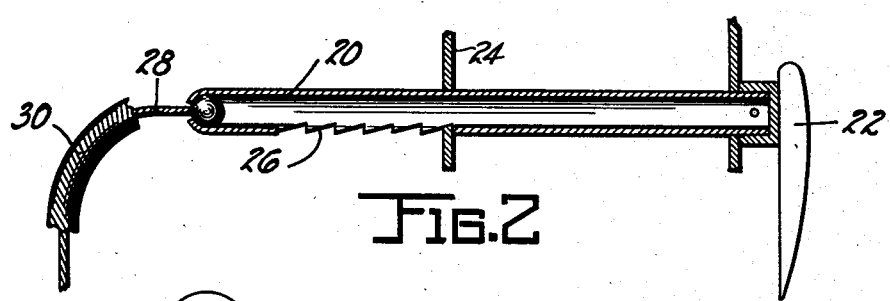
Figure 2 is an enlarged section showing the emergency brake lever and its mounting.
Figure 3:
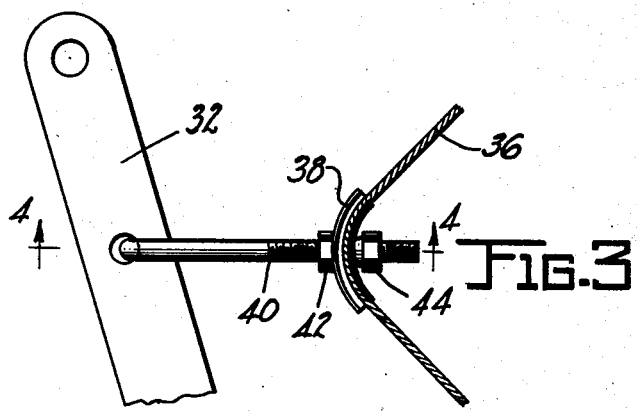
Figure 3 is a horizontal section showing the novel adjustable connection between the cable acting on the two rear brakes and the operating mechanism therefor.
Figure 4:
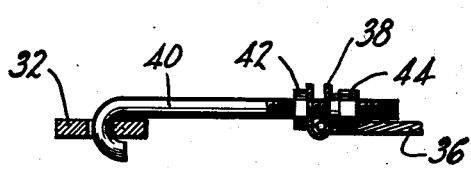
Figure 4 is a section on the line 4—4 of Figure 3.

The automobile chassis illustrated includes the usual frame 10, carried by front and rear axles 12 and 14 mounted on wheels 16 having brakes 18. For service braking the brakes may be applied in any desired manner, as for example by the usual hydraulic operating system.

The usual emergency lever may, if desired, be replaced by a plunger 20 provided with a handle 22 and slidably mounted in a sleeve 24 carried by the dash. The plunger 20 may have suitable ratchet teeth 26 engageable with the end of a slot in the wall of the sleeve 24. The end of the plunger 20 is attached to a cable 28 slidable in a sleeve 30, forming a Bowden-type control, and which is connected to a horizontal emergency brake-operating lever 32 fulcrumed on the frame 10.

The two rear brakes are provided with applying devices connected to the ends of a cable 36, the central portion of which is embraced by a curved upwardly-facing channel-section member 38, which may be made as a steel stamping. A part such as a threaded rod 40 is connected at its forward end to the lever 32, being bent to form a hook seated in an opening in the lever, and at its rear end passes through alined openings in the walls of the member 38.

Means, such as nuts 42 and 44, is provided for adjusting the position of the member 38 on the part 40. By backing off on the nut 42 and taking up on the nut 44, the slack may be taken out of the system. Upon further tightening the nut 44, the walls of member 38 are clamped frictionally upon the cable 36.

While this adjustment has been described as part of an emergency brake operating system, it is adapted also for use in a mechanical service brake operating system, or in the mechanical portion of a hydraulic or air brake system. It is not my intention to limit the scope of the invention to the particular mechanism described, or otherwise than by the terms of the appended claims.

I claim:

1. Brake-operating mechanism comprising a cable connected at its ends to operate brakes, a channel-section member embracing the central portion of the cable, a part passing through the walls of said member, and means for adjustably securing said walls to said part and springing said walls toward each other to clamp the cable between them.

2. Brake-operating mechanism comprising an actuating member connected at its ends to operate brakes, a channel-section member embracing the central portion of the actuating member, a threaded part passing through the walls of said channel-section member, and nuts threaded on said part for adjustably securing said walls to said part and springing said walls toward each other to clamp the actuating member between them.

GEORGE K. McCANN.